Figure 1:
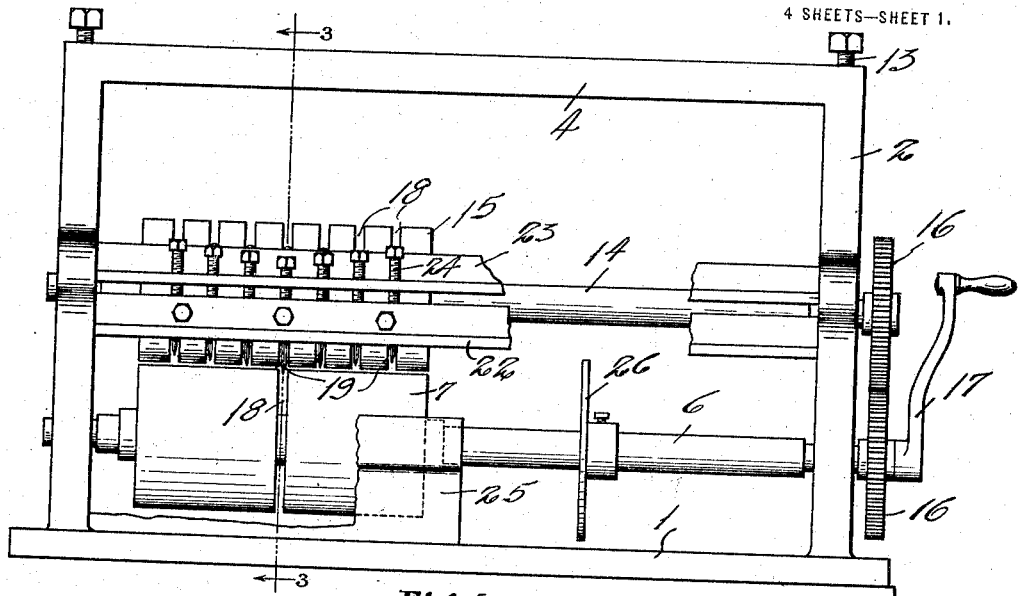

L. R. MOORE.
CUTTING AND STEPPING MACHINE.
APPLICATION FILED MAR. 15, 1918.

1,303,221.

Patented May 6, 1919.
4 SHEETS—SHEET 1.

WITNESSES:
C. A. Ellis

INVENTOR.
Lee R. Moore
BY
Jack A. Schley
ATTORNEY.

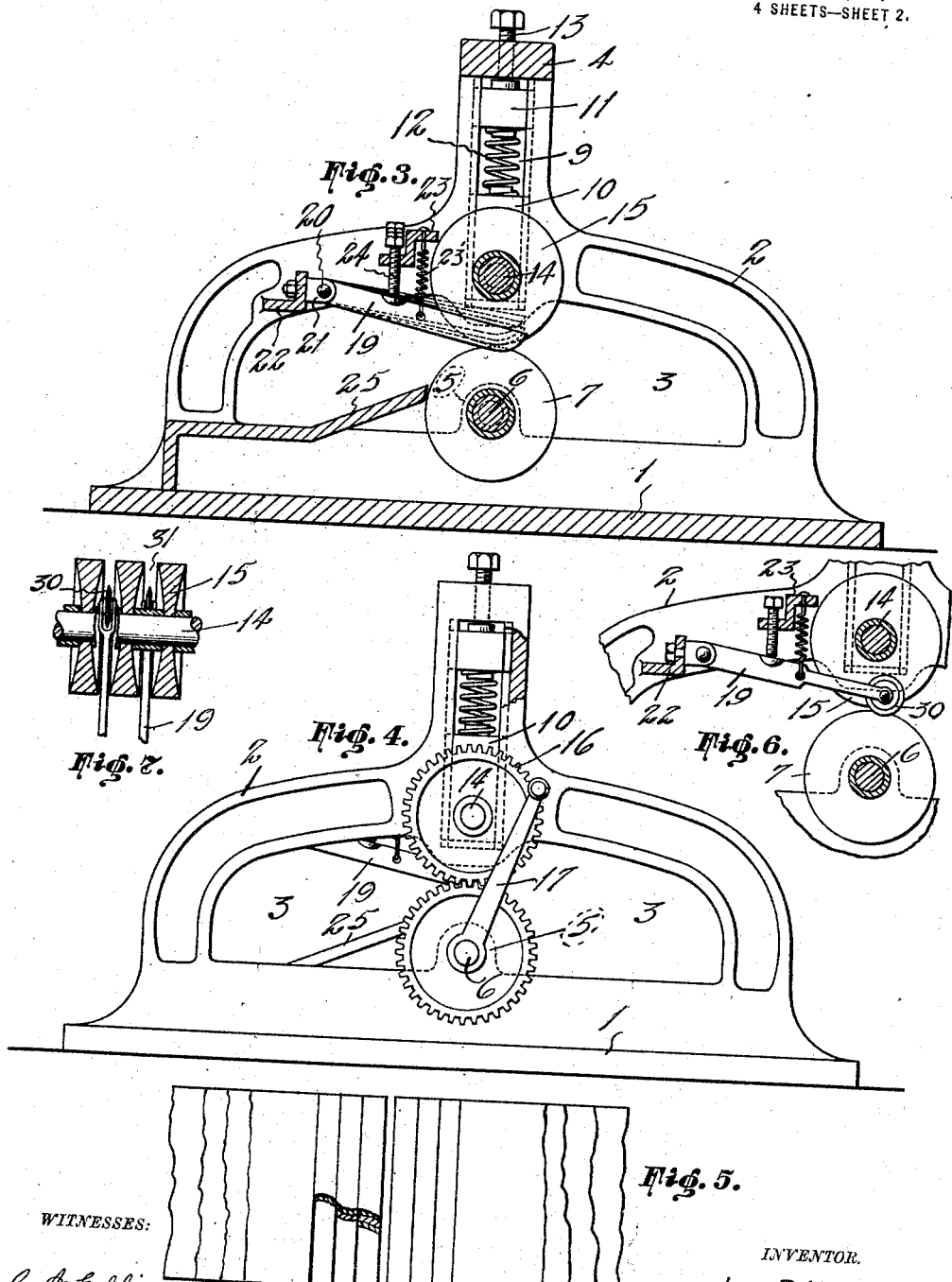

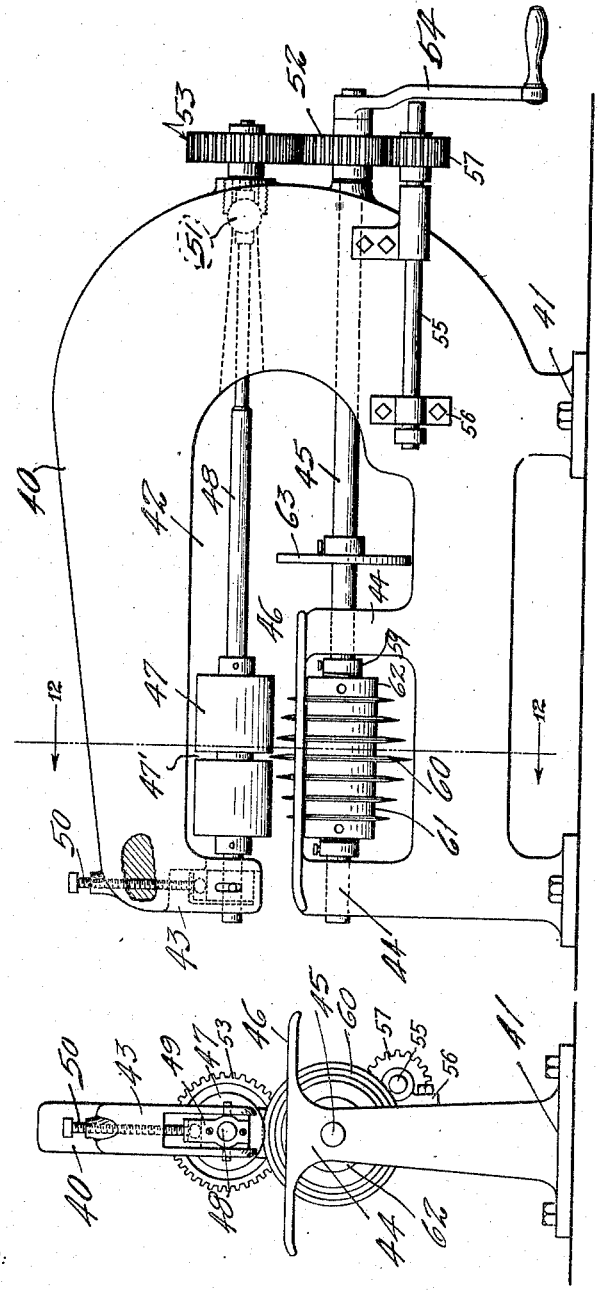

L. R. MOORE.
CUTTING AND STEPPING MACHINE.
APPLICATION FILED MAR. 15, 1918.

1,303,221.

Patented May 6, 1919.
4 SHEETS—SHEET 4.

WITNESSES:
C. A. Ellis

INVENTOR.
Lee R. Moore
BY
Jack A. Schley
ATTORNEY.

UNITED STATES PATENT OFFICE.

LEE R. MOORE, OF DALLAS, TEXAS.

CUTTING AND STEPPING MACHINE.

1,303,221.　　　　　Specification of Letters Patent.　　Patented May 6, 1919.

Application filed March 15, 1918.　Serial No. 222,784.

*To all whom it may concern:*

Be it known that I, LEE R. MOORE, a citizen of the United States, residing at Dallas, in the county of Dallas and State of Texas, have invented certain new and useful Improvements in Cutting and Stepping Machines, of which the following is a specification.

This invention relates to new and useful improvements in cutting and stepping machines.

In the manufacture of blowout guards for the inner tubes of pneumatic tires such as is shown in my co-pending application filed November 27th, 1917, Serial No. 204,262, it is customary to use worn and discarded tire casings. Tire casings are formed of a number of layers cemented together. The outer covering of rubber is removed from the casing and the beads or shoes are trimmed off. This leaves a structure formed of layers of fabric and rubber cemented together. The remaining part of the casing is cut in lengths as desired for the guards. In order to bevel or reduce the ends of the guard the layers are cut in stepped order. This is done by removing a short length of the top layer at each end, then removing a shorter length of the next layer and a still shorter length of the next layer and so on until a stepped construction is produced.

It has been customary to do this work by hand, the worker using a sharp knife and gaging the depth of his cut by the pressure exerted. Such a method is not only slow and laborious but inaccurate and expensive and further unless the workman is an expert some of the material is likely to be cut too deep and would thus be useless.

I have conceived the idea of cutting the casing strips into lengths and at the same time stepping their ends mechanically, whereby accuracy is assured and all of the foregoing objections overcome as well as an increase in the capacity. The invention contemplates severing the casing transversely and making transverse incisions to different depths in spaced order and then removing the ends of the layers beyond the incision which leaves the remaining layers in stepped order.

In carrying out the invention it is proposed to employ a plurality of cutting members having their cutting portions or points disposed in stepped order so as to cut at different depths; and to associate these members with propelling and guiding means and a suitable support so that the work may be properly fed to the cutting members and the cutting and stepping expeditiously and efficiently carried out. It is to be understood that the invention is not limited to cutting tire casings and any equivalent laminated material could be handled.

It is obvious that various structures could be evolved in reducing this invention to practical and actual experiments and tests if shown that knife blades with cutting edges as well as revolving cutting disks can be satisfactorily used. Certain conditions are encountered in cutting this material owing to its nature. The material is tough and considerable pressure is required to drive the cutting members through the layers. This requires that a substantial supporting framework be provided and means for propelling the material over or under the cutting members, and at the same time either pressing the material toward the cutting members or pressing the cutting members toward the material, the former having been found to be more practical.

A machine constructed in accordance with this invention would involve a stout substantial support in which a pressure roller is mounted and provided with a circumferential groove or depression. The cutting members would be mounted in the support so that one of said members would project into the groove of the pressure roller so that when the material was inserted between the cutting members and the pressure roller the same would be severed. Means for revolving the pressure roller would also be provided together with such adjustments and other parts as might be necessary. For instance the cutting members would have to be sharpened from time to time and this would necessitate some adjustment in order to cut the layers properly and it might be necessary to make adjustment for layers of different thicknesses.

It is also proposed to arrange the cutting members so as to step the severed ends of the material on each side of the severing cutter and as the lengths are cut from a continuous strip much time would be saved and all except the end lengths or guards would be stepped at each end, the latter requiring one end to be stepped separately, although it might be possible to overcome this by constructing the supporting frame to receive the tire casing before it is severed.

The invention will be more readily understood from a reading of the following specification and by reference to the accompanying drawings, in which an example of the invention is illustrated, and wherein—

Figure 2:
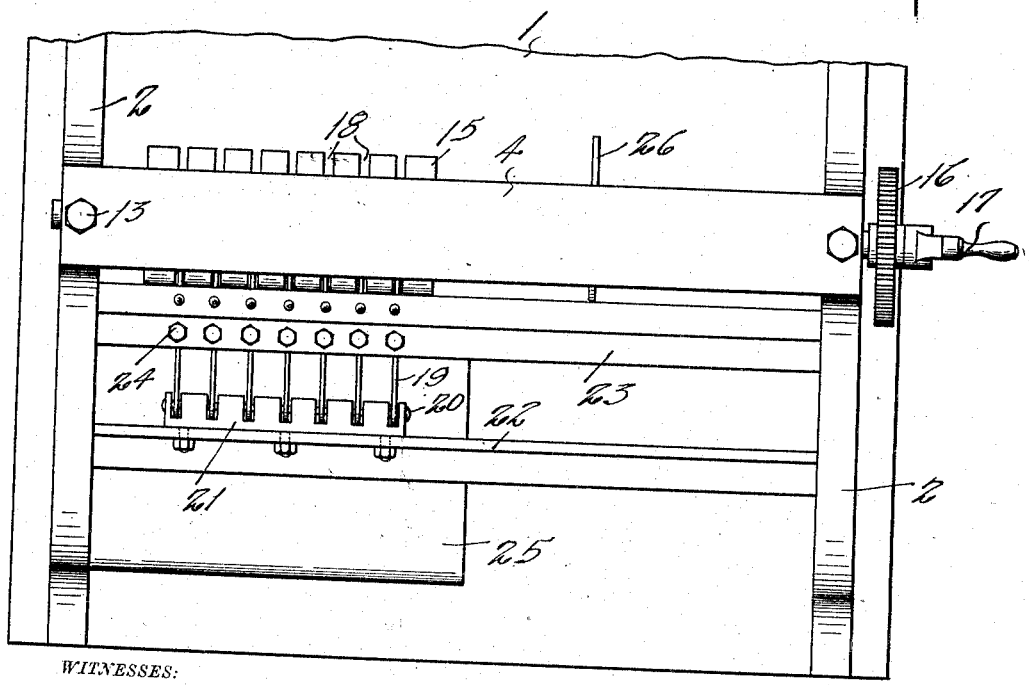
Figure 10:
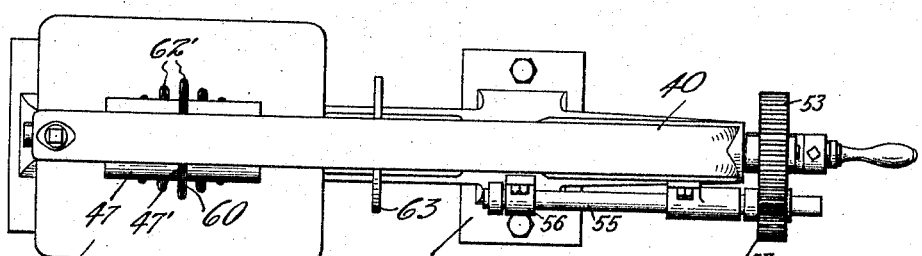
Figure 11:
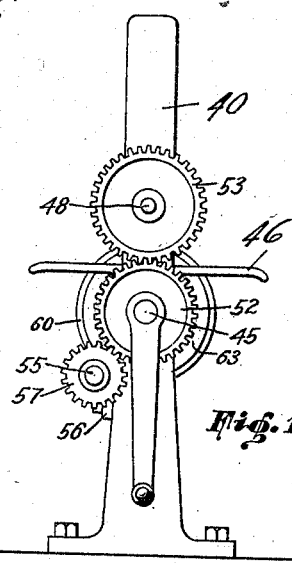
Figure 12:
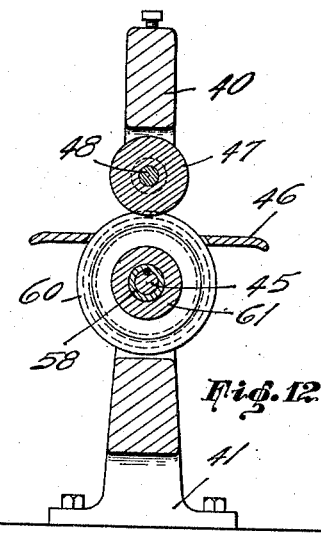
Figure 13:
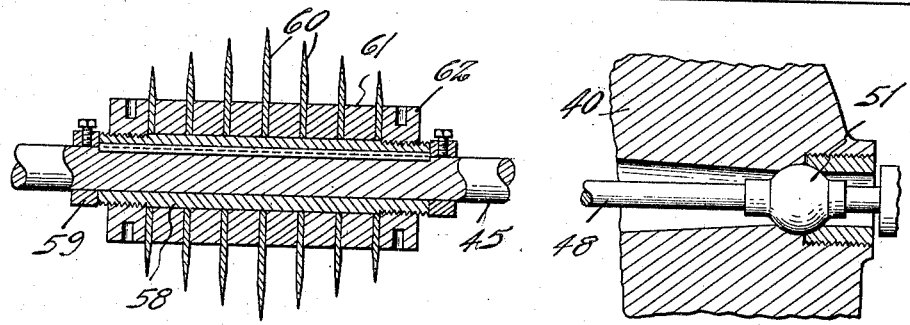
Figure 14:
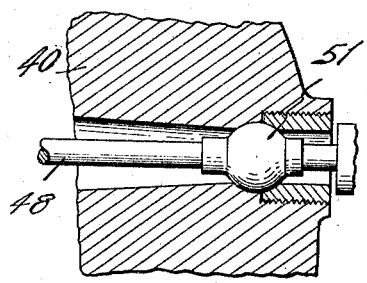

Figure 1 is a front elevation of a machine constructed in accordance with this invention, parts being illustrated as broken away to show the underlying structure, Fig. 2 is a partial plan view of the same, Fig. 3 is a transverse vertical sectional view on the line 3—3 of Fig. 1, Fig. 4 is an end elevation of the same, Fig. 5 is a plan view showing a piece of material after it has been severed and stepped, Fig. 6 is a sectional detail showing a modified form of cutter, Fig. 7 is another detail of the form shown in Fig. 6, Fig. 8 is a side elevation of a modified form of structure involving this invention, Fig. 9 is an end elevation of the same, Fig. 10 is a plan view of the modified form, Fig. 11 is an elevation of the end opposite to that shown in Fig. 9, Fig. 12 is a transverse vertical sectional view of the line 12—12 of Fig. 8, Fig. 13 is a sectional detail of the cutting member, and Fig. 14 is a detail of one of the bearings.

I will describe the structure shown in Figs. 1 to 4 inclusive in which the numeral 1 designates a base plate at each end of which standards 2 are disposed transversely. These standards as shown in Figs. 3 and 4 have large openings 3 wide enough to admit the material to be worked on. The standards are connected by a top bar 4 and with the same form of supporting frame of integral construction and having provision for admitting the material to be severed.

Within the frame or supporting structure the working elements of the machine are mounted. At the center of each standard a bearing box 5 is disposed at the bottom of the opening 3 and receives a shaft 6 extending longitudinally of the frame above the base 1 and below the bar 4. Near the left hand end of the frame a roller 7 is made fast on the shaft 6 and is provided with a central circumferential groove or channel 8. Each standard above the opening 3 has a central vertical guide-way 9, in the lower portion of which a bearing box member 10 is mounted for vertical movement. A follower block 11 is mounted in the upper portion of each guide-way and a coiled spring 12 is confined in each guide-way between the parts 10 and 11, while each block 11 is vertically adjustable by means of a set screw 13 by which the tension of the springs can be controlled. The boxes 10 yield upward against the tension of the springs 12.

A shaft 14 above the shaft 6 is mounted in the boxes 10. On the shaft 14 a pressure roller 15 is fastened over the roller 7. The ends of the shafts 6 and 14 project beyond the standard at the right hand end of the frame and have mounted thereon gears 16 in mesh as shown; while a crank handle 17 is applied to the end of the shaft 6 whereby the latter is revolved and in turn revolves the shaft 14 by means of the gears. It is to be understood that the crank handle may be omitted and the shafts driven by power. The rollers 7 and 15 are driven in opposite directions and material presented to the same will be propelled therebetween.

The roller 15 is formed with deep transverse grooves or slots 18 which receive the free ends of cutting members or blades 19 pivoted in common on a pin 20 mounted in a bracket 21 fixed on an angle bar 22 extending between and rigidly secured to the standards 2. The blades 19 are spaced apart at the distance required between each incision or the width of each step. An angular cross bar 23 extends between the standards and rigidly secured thereto adjacent the roller 15. The vertical adjusting screws 24 are threaded through this bar and have their lower ends swiveled to the blades. A coiled spring extends from each blade up to the bar 23, being attached to the blade at a point between the adjacent screw and the cutting end of said blade so as to tend to pull the blade up in its groove 18 of the pressure roller. The free or cutting end of each blade is reduced to a knife edge and is practically rounded as shown in Fig. 3. Said knives are disposed on an incline so as to permit the material to pass thereunder.

Under the knives and the bar 22 a work-table 25 is mounted and is provided with an inclined portion terminating in proximity to the roller 7. The blades 19 are adjusted at different elevations by the screws 24, the central blade being set so as to project into the groove 8 while each successive blade on each side of the central blade is set higher than its preceding blade whereby said blades are stepped upward from the central blade. The roller 15 is normally in juxtaposition to the roller 7 and when the work is presented to the rollers the pressure roller 15 is displaced upward so that the blades 19 enter the material at the proper depth. A gage disk 26 is adjustable longitudinally of the shaft 6 and the distance between this disk and the central cutting blade determines the length of the guard which is cut off from the strip of material. In Figs. 6 and 7 the cutting members or blades 19 instead of having rounded knife edges are provided at their free ends with small cutting disks 30, and the roller 15 instead of having straight sided grooves 18 is provided with grooves 31 flaring inward as shown in Fig. 7 to accommodate the bearings for the disk 30.

In operating the machine the strip of material is passed through the opening 3 of the left hand standard 2 over the table 25 until it abuts the gage disk 26 which has been previously set for the desired adjustment. Motion being imparted to the shafts 6 and 14 the strip of material is now moved under the blades 19 over the table 25 toward the rollers. As the side of the strip enters between the rollers the roller 15 is displaced upward thus exposing the cutting ends of the blades 19 which enter the material according to their projection below the pressure roller. The central blade 19 passes entirely through the strip and severs it as indicated in Fig. 5. The blades next to the central blade on each side thereof cut through all of the layers except the bottom layer, while the next blade on each side cuts down to the two bottom layers and the next blade leaves three layers uncut. As many blades as are necessary may be provided. It is evident that the casing or strip of material is quickly passed between the rollers and the work expeditiously done. The severed length or guard is removed and the strip of material moved into the frame until it abuts the disk 26. When this last length is severed it will have both ends stepped. It is necessary to remove the short portions of the layers at each end of the guard and this is easily done by pulling off the same with a pair of pliers. The material can only be removed to the depth to which it is cut and thus the severed ends are left.

In Figs. 8 to 14 I have shown another form of machine involving this invention and have found the same to operate more easily and with less friction on the cutting members than in the form shown in Figs. 1 to 4 inclusive. In the modified form the supporting frame is in the form of a gooseneck casting 40 having feet 41 on which it is supported and provided with a throat 42 in which the cutting and stepping elements are mounted. The throat of the casting is open at the left hand end at which location a head 43 is provided. The lower portion of the casting is provided with bosses 44 projecting into the lower portion of the throat and constituting bearings for a longitudinal shaft 45 which extends through the casting as shown. The bosses 44 support a work table 46 and above the same a pressure roller 47 is mounted on a shaft 48. The shaft is supported at one end in a take-up box 49 swiveled in the head 43 and adjustable vertically by means of a screw 50. The shaft 48 has its right hand end supported in swinging bearing box 51 journaled in the casting 40, as shown in detail in Fig. 14. The end of the shaft 48, carried by the box 49, may be adjusted vertically by reason of the bearing 51. The adjustment will always be quite minute and owing to the length of the shaft 48 the displacement of its right hand end will be negligible. A gear 52 is fastened on the right hand of the projecting end of the shaft 45 and meshes with a gear 53 fastened on the projecting end of the shaft 48. A crank handle 54 is fastened on the shaft 45 and is used to revolve the same whereby motion is transmitted to the shaft 48 through the gears 52 and 53. When it is desired to mechanically drive the machine motion is transmitted by suitable means (not shown) to a jack shaft 55 mounted on the side of the casting 40 in boxes 56. This shaft has mounted thereon a pinion 57 meshing with the gear 52 for driving the latter when the handle 54 is removed. The gears should be so proportioned that the shaft 45 will revolve at a slightly higher rate of speed than the shaft 48.

The pressure roller 47 has a central groove or channel 47'. On the shaft 45 between the bosses 44 a cutting member is disposed and includes a sleeve 58 splined on the shaft 45 and held against longitudinal displacement by set collars 59 at each end, as shown in detail in Fig. 13. A plurality of cutting disks 60 are mounted on the sleeve and spaced apart by rings or collars 61. At each end of the sleeve lock-rings 62 are threaded thereon. These rings when screwed up against the outermost disks bind the parts tightly together as shown. The central cutting disk 60 has the greatest diameter, and the disks on each side are stepped off each successive disk being less in diameter as illustrated. The disks project freely through slots 62' in the table 46.

The cutting disks may project any distance desired above the table 46 as the table is not employed to control the depth of the cut, but the pressure of the roller 47 is depended upon to press the material down on to the cutters and by adjusting the screw 50 the depth of the cuts is controlled. A gage disk 63 is adjustably mounted on the shaft 45. The cutter disks being mounted on the shaft 45 are revolved a little faster than the roller 47 so as to reduce friction. The operation it is believed will be obvious in view of the foregoing description.

What I claim is:

1. In a cutting and stepping machine, a support, an intermediate cutting member mounted on the support and adjusted to sever material subjected thereto, and other non-severing cutting members mounted on each side of the intermediate cutting member adjusted to cut at different depths in stepped order.

2. In a cutting and stepping machine, a support, an intermediate cutting member mounted on the support and adjusted to sever material subjected thereto, other non-severing cutting members mounted on each side of the intermediate cutting member adjusted to cut at different depths in stepped order, and means for serving material to be cut to the cutting members.

3. In a cutting and stepping machine, a support, a cutting device mounted on the support and having cutting edges projecting beyond each other in stepped order, and a work sustaining member having an opening for receiving one of the cutting edges of the cutting device, whereby the material passed between the cutting device and the said member is severed, the other cutting edges of the cutting device terminating short of said member in stepping order, whereby the material passed between the same and the member is cut in stepped order.

4. In a cutting and stepping machine, a support, a plurality of cutting members mounted on the support, and a pressure roller mounted on the support and having a circumferential groove receiving one of the cutting members, the other cutting members terminating in stepped order with relation to the pressure roller.

5. In a machine for cutting the laminated material into lengths and stepping off the layers at the ends of said lengths, a support, a plurality of cutter disks of varying diameters disposed in stepped order, and means for serving the laminated material to the disks and having provision for receiving one of the disks, whereby the material is severed and cut into lengths and the other disks cut into the material and cut the layers in stepped order.

6. In a cutting and stepping machine, a support, a plurality of cutting members mounted on the support disposed in stepped order to cut material of different depths, and a length gage disposed laterally of the cutting members.

7. In a cutting and stepping machine, a support, a shaft mounted in the support, a plurality of cutter disks of stepped diameters mounted on the shaft, and a length gage adjustable on said shaft.

8. In a cutting and stepping machine, a support, a shaft mounted in the support, a plurality of cutter disks of stepped diameters mounted on the shaft, a length gage adjustable on said shaft, and a pressure roller having a circumferential groove receiving one of the cutter disks.

In testimony whereof I affix my signature.

LEE R. MOORE.

Copies of this patent may be obtained for five cents each, by addressing the "Commissioner of Patents, Washington, D. C."